United States Patent Office 2,746,881
Patented May 22, 1956

2,746,881

ADHESIVE PAPER SHEET OR TAPE AND A METHOD OF PREPARING THE SAME

August Wegener, Alfeld, Leine, Germany

No Drawing. Application December 29, 1950,
Serial No. 203,563

Claims priority, application Germany January 3, 1950

5 Claims. (Cl. 117—76)

The invention relates to a method of preparing adhesive paper sheet or tape, particularly of the type which subsequently is to be printed upon a letterpress or platen machines.

In printing on adhesive paper by the planographic or typographic printing process, the difficulty arises that the adhesive paper sheets or tapes wave or curl to a certain extent, i. e. they do not lie flat, which is extremely objectionable and increases the waste. In order to reduce such waste, the printing machines must be operated at relatively low speeds.

It is a principal object of the invention to provide a method for preparing adhesive paper products which are, when being printed upon, not subject to the drawbacks cited hereinabove.

Other objects and advantages will be apparent from a consideration of the specification and claims.

I have found that adhesive paper sheet and tape, which does not curl on printing, can be obtained by interposing between the paper base and the adhesive layer a thin film or coating, essentially a moisture impermeable film, to which the adhesive layer is applied.

Said film layers may be made of various compounds, provided they satisfy the condition of being impermeable to moisture. The layers may consist, for instance, of lacquers of a suitable composition, such as nitrocellulose, moistureproof cellulose acetate, plastics made of polystyrene, chloroprene, polyethylenesulphide, thiokols, polyvinyl compounds, also bituminous synthetic and natural products, and others. These lacquers are dissolved in volatile organic solvents, applied as a thin layer to the paper base and quickly dried, for instance by passing the coated paper web through a drying duct, whereby the volatile solvent may be recovered. Rubber solutions as they are used for cementing rubber layers, i. e. solutions containing natural or synthetic rubber or mixtures thereof dissolved in organic solvents, may be employed with advantage.

Traveling paper webs which have been provided with such film layers are subsequently, preferably in the same operation, coated with an adhesive mass. In applying the adhesive coating, the difficulty will frequently arise that when aqueous adhesive masses are used, the film layer will not properly be covered with the adhesive mass and that areas free of adhesive will remain.

To obviate this difficulty, I apply a wetting agent to the film layer. The wetting agent may be applied, prior to the adhesive coating, in the form of a fine powder, or as an aqueous solution if the wetting agent is water soluble, such as Neradol (a naphthalene sulphuric acid-formaldehyde condensation product). A great number of such wetting agents suitable for the described purpose are known, of which only alcoholic fatty sulfonates may be mentioned.

Instead of, or in addition to, the wetting agents proper, finely pulverized substances may be blown onto the film layer, for instance talcum, barium sulphate, titanium dioxide, and others, or mixtures thereof, also adhesive substances in finely divided state, such as finely pulverized dextrine or gum Arabic or mixtures thereof, and mixtures of the pigments recited hereinbefore and/or adhesives and/or wetting agents may be used. These substances must be applied in very thin layers and in a very fine state of dispersion; they adhere particularly well when the film layer possesses a certain elasticity as presented by rubber-like products such as rubber itself, polystyrenes, chloroprenes, thiokols and the like. These fine powders have a strong surface affinity and ensure a ready distribution of the adhesive mass on the film layer so as to provide a uniform and complete adhesive coating thereon.

All kinds of conventional adhesives may be used, such as dextrine, gum Arabic, starch products, vegetable gums, cold glues, casein products, and others.

The adhesive papers obtained in accordance with the invention are much better suited for printing purposes than the papers known heretobefore, where the curling is very troublesome and which are very difficult to hold completely flat on the printing surface. The novel adhesive paper is much less sensitive to humidity changes of the air and can be run through the printing press much quicker than known papers.

What I claim is:

1. A method of preparing an evenly coated adhesive paper sheet material which will lie flat on printing, comprising the steps of applying to one face of a traveling paper web first a water-impervious resin layer, then the solution of a wetting agent and finally an aqueous water soluble adhesive, and drying the web, thereby obtaining a uniform adhesive surface completely covering the resinous ground layer.

2. A method as defined in claim 1, wherein the wetting agent is a member of the group consisting of naphthalene sulfonic acid-aldehyde condensation products and fatty alcohol sulfonates.

3. A method as defined in claim 1 wherein the synthetic resin is a hydrocarbon polymer.

4. An adhesive paper sheet or tape having a flat surface suitable for printing, said sheet or tape comprising a paper base, a resin film on said base providing a barrier layer impervious to moisture, a surface layer of a water soluble adhesive, and between said barrier layer and said surface layer a layer of a wetting agent producing a uniform distribution of the adhesive on the resin.

5. An adhesive paper sheet or tape having a flat surface suitable for printing, said sheet or tape comprising a paper base, a water-soluble adhesive coating, a water-impervious resin layer interposed between and firmly and permanently uniting said paper base and adhesive coating, said layer providing a barrier layer impervious to moisture, and uniformly distributed on the contact face of said layer with said adhesive coating a wetting agent suitable to provide for a uniform distribution of said adhesive coating.

References Cited in the file of this patent

UNITED STATES PATENTS

| Number | Name | Date |
|---|---|---|
| Re. 21,762 | Drew | Apr. 8, 1941 |
| 1,225,735 | MacLaurin | May 8, 1917 |
| 1,413,921 | MacLaurin | Apr. 25, 1922 |
| 2,038,325 | Van Cleef | Apr. 21, 1936 |
| 2,240,476 | Simmons | Apr. 29, 1941 |
| 2,295,613 | Stillwell | Sept. 15, 1942 |
| 2,300,224 | Humphner | Oct. 27, 1942 |
| 2,361,665 | Toland et al. | Oct. 31, 1944 |
| 2,443,889 | Bruce et al. | June 22, 1948 |